(12) United States Patent  
Franz-Burgholz et al.

(10) Patent No.: US 6,750,465 B2
(45) Date of Patent: Jun. 15, 2004

(54) DEVICE FOR EVALUATING DIFFRACTIVE AUTHENTICITY FEATURES

(75) Inventors: Arnim Franz-Burgholz, Falkensee (DE); Roland Gutmann, Falkensee (DE); Harald Hoeppner, Berlin (DE); Thomas Löer, Berlin (DE); Detlef Märtens, Berlin (DE); Günther Dausmann, Erding (DE); Zishao Yang, Erding (DE); Robert Massen, Öhningen (DE); Thomas Franz, Konstanz (DE); Thomas Leitner, Konstanz (DE); Jörg Eberhardt, Tettnang (DE)

(73) Assignee: Bundesdruckerei GmbH, Berlin (DE)

( * ) Notice: Subject to any disclaimer, the term of this patent is extended or adjusted under 35 U.S.C. 154(b) by 12 days.

(21) Appl. No.: 10/373,884

(22) Filed: Nov. 25, 2002

(65) Prior Publication Data

US 2003/0174308 A1 Sep. 18, 2003

Related U.S. Application Data

(63) Continuation of application No. PCT/EP01/05989, filed on May 25, 2001.

(30) Foreign Application Priority Data

Jun. 7, 2000 (DE) .......................................... 100 28 239

(51) Int. Cl.[7] .......................... G01N 21/86; G01N 5/00; G01N 21/90; G01N 21/00
(52) U.S. Cl. .......................... 250/559.44; 250/559.08; 250/559.4; 250/559.01; 250/556; 356/430; 356/239.3

(58) Field of Search .................... 250/237 R, 559.01, 250/559.07, 559.08, 559.39, 559.4, 559.44, 556; 356/430, 431, 239.2, 239.3

(56) References Cited

U.S. PATENT DOCUMENTS

| 4,184,700 | A | | 1/1980 | Greenaway ..................... 283/6 |
| 5,032,003 | A | | 7/1991 | Antes ..................... 350/162.18 |
| 5,452,079 | A | * | 9/1995 | Okugawa .................. 356/239.1 |
| 5,461,239 | A | | 10/1995 | Atherton ..................... 250/566 |
| 5,508,801 | A | | 4/1996 | Panin et al. |
| 5,854,673 | A | * | 12/1998 | Beale et al. ................... 356/71 |
| 5,943,131 | A | | 8/1999 | Dausmann et al. |
| 6,097,035 | A | * | 8/2000 | Belongie et al. ............. 250/556 |
| 6,445,452 | B1 | * | 9/2002 | Kondou et al. ............. 356/430 |

FOREIGN PATENT DOCUMENTS

| DE | 197 21 525 A1 | 12/1998 | |
| WO | WO-95/12860 A1 | 5/1995 | |
| WO | WO 98/55963 | * 12/1998 | |
| WO | 98/55963 | 12/1998 | .......... G06K/19/16 |
| WO | WO-99/06966 A1 | 2/1999 | |

* cited by examiner

Primary Examiner—David Porta
Assistant Examiner—David C. Meyer
(74) Attorney, Agent, or Firm—Darby & Darby

(57) ABSTRACT

An apparatus for evaluating distinguishing authenticity features comprising diffraction elements on a document which is illuminated by an illumination source. The distinguishing authenticity element which is to be examined, diffracts the beam of the illuminating source and projects it onto an evaluating unit in the device. In order to be independent of the nature and location of the diffraction pattern, the diffraction pattern derived from the document to be examined is projected onto a screen and the image of the pattern recorded and evaluated by a camera (matrix or cells).

11 Claims, 2 Drawing Sheets

DEVICE FOR EVALUATING DIFFRACTIVE AUTHENTICITY FEATURES

This is a continuation of PCT/EP01/05989 filed May 25, 2001.

This invention relates to a device for evaluating authenticity features based on the diffraction patterns produced by irradiating diffraction elements with optical energy.

BACKGROUND OF THE INVENTION

Many different techniques are used to authenticate documents and things which are subject to counterfeiting or forgery. By way of example only, documents which are particularly in need of authentication include bank notes, identification papers, passports, packagings, labels and stickers, drivers licenses, admission tickets and other tickets, tax stamps, pawn stamps and stock certificates. Typically, an "authentication element" is printed or otherwise attached to the document or thing which is to be secured. The authentication element can be analyzed when it is necessary to authenticate the document.

It is known to use diffraction elements for authentication purposes. Such diffraction elements are usually holograms. One type of hologram contains a diffraction grating on the surface of the element. The diffraction grating is formed by elevations and impressions made by embossing. Another of type of hologram (known as a "thick hologram") contains a diffraction grating within the volume of the material. The diffraction grating is formed by local differences in optical density caused by laser treatment. In the preferred embodiment, a diffraction element may comprise either of the foregoing elements but the invention is not limited to a particular type of diffraction element and concerns instead the apparatus for evaluating the element to establish authenticity of a secured document.

PCT application No. WO 98/55963 discloses the use of a diffusion element or marking on a document which, when irradiated by a laser, will diffract and reflect the laser beam in the form of a characteristic pattern. The diffraction pattern produced is projected onto photodiodes which are fixed in position within a housing at sites where the characteristic diffraction pattern is expected. Authenticity of the document can then be determined based on whether or not the photodiodes are receiving a diffraction pattern. For a system to work, the photodiodes must be disposed at predetermined fixed positions. If the diffraction element or marking is displaced or changed slightly on the surface of a document, or if a different type of diffraction element is used, the diffraction pattern will not be received at the fixed photodiodes. Hence, this particular device can be used only with documents having the same diffraction elements in the same place on the document.

PCT application WO 98/55963 discloses that the photodiodes may be arranged in the form of a matrix in order to receive a larger range of diffraction patterns. Nevertheless, it is not practical to use photodiodes which are fixed in position to determine different diffraction patterns at different places where intensity differs.

A further disadvantage of photodiodes is their coarse resolution, which is far less than the high-resolution capability of matrix cameras or cell cameras with light-sensitive CCD or CMOS sensors. They are therefore not suitable for smaller, finely distributed distinguishing authenticity features.

It is therefore an object of the invention to provide a device of the type described above in which a greater diversity of distinguishing authenticity features based on diffraction elements can be identified, and the checking of the authenticity of a document is independent of the position at which the distinguishing authenticity feature(s) containing the diffraction element(s) are fixed on the document.

SUMMARY OF THE INVENTION

In accordance with the invention, the diffraction patterns derived from the document to be examined are imaged onto a projection surface and the diffraction picture, formed on the projection surface, is observed and evaluated by a camera which covers the projection surface.

The advantage of the invention is that the places at which the diffraction patterns are incident on an examining surface are no longer fixed. It is therefore immaterial where the diffraction pattern is incident. The whole of the projection surface is observed with a camera (matrix or cell camera) and the characteristic diffraction image formed on the surface is evaluated. The evaluation of this diffraction image is a measure of the authenticity of the document.

With the invention, light-sensitive sensors no longer have to be disposed at fixed places on a projection surface; instead, different, even variable, diffraction patterns can be evaluated, because the projection of the diffraction pattern is examined by camera on a projection surface.

Different diffraction structures of different natures and at different places on the document can be examined simultaneously or consecutively, because only the diffraction pattern cast by the diffraction element(s) onto the projection surface is examined by camera.

The expression "projection surface" is generally understood. In one embodiment, a matt disk onto which the diffraction patterns are reflected, can be provided as a projection surface. A camera, which evaluates the diffraction pattern on the matt disk, is disposed below the disk.

The camera may image and evaluate regions of the matt disk or the entire surface of the matt disk in a single step.

If the camera is separated from the matt disk, it is immaterial in accordance with the invention whether the camera moves with the optionally movable matt disk, or the matt disk alone is moved and the camera is stationary.

Moreover, for evaluating a diffraction element in a document, there are several different embodiments, all of which are included in the invention.

In a first embodiment, the laser provided for illuminating the diffraction element in the document, is constructed so that it can move only, for example, in the X direction and is stationary in the Y direction.

In a different embodiment, the laser may be fixed immovably, for example, to the housing and cannot be deflected itself, but the beams of the laser are directed onto a rotating mirror, which can be deflected over a certain angular range. The laser beam which is deflected by the rotating mirror is then directed over a telecentric mirror, which is fixed in a position in the housing, onto the diffraction element in or on the document.

In both embodiments, the matt disk may be movable in the Y direction (scanning direction) with a stationary deflection mirror disposed on the matt disk so that the beam generated by the laser is passed over the mirror onto the stationary diffraction element in the document.

In a first embodiment, the deflection mirror for the laser beam takes up approximately the whole width of the matt disk. This arrangement has the advantage that the matt disk itself does not have to be moved in the X direction.

In a different embodiment, the width of the deflection mirror is significantly less than the width of the matt disk, and the entire matt disk is movable in the X as well as the Y direction so that it can be moved under the stationary diffraction element, the laser then being coupled to the matt disk.

THE DRAWINGS

DETAILED DESCRIPTION

Figure 1:
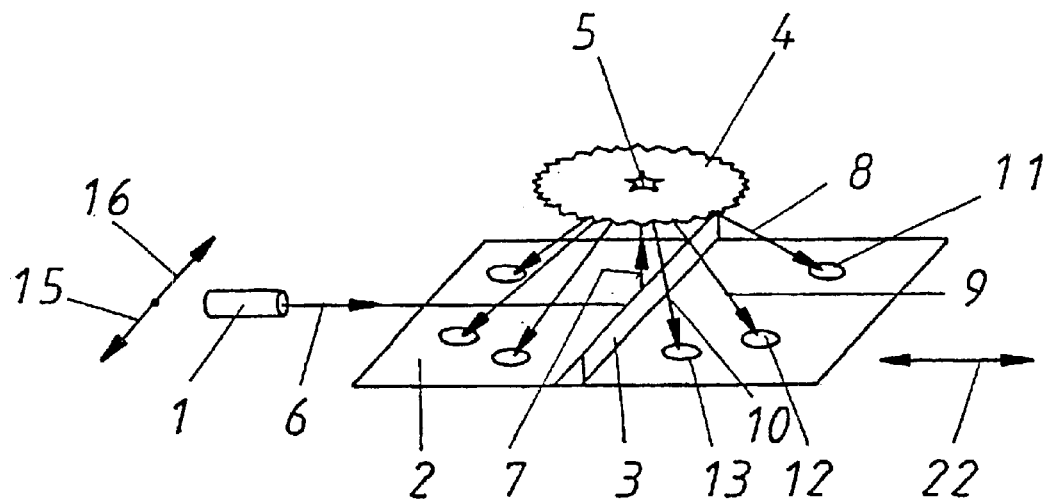
FIG. 1 shows a diagrammatic first embodiment of the invention.

In FIG. 1, a laser 1 emits a beam 6 in the horizontal direction and is disposed in the housing of a document-examining device, the details of which are not shown. The laser can be moved in the directions of arrows 15, 16 corresponding to the X direction.

The beam 6 is reflected from a mirror 3, which has a triangular profile, and passed in the form of a beam 7 against a stationary document which may have, for example, an authenticity region 4 in which a diffraction element 5 is disposed. A secured document may contain one or more authenticity regions 4. The diffraction element 5 is one part of the authenticity region which may contain other authenticity elements such as luminescent or phosphorescent pigment, silver threads, etc. Of course, the present invention is not limited to the arrangement of a diffraction element 5 in the region 4. Diffraction elements 5 may also be isolated or integrated in or on the surface of the document.

In FIG. 1, a projection screen is shown as a matt disk 2. Other screens may be used. A mirror 3 extends over the whole width of matt disk 2 which carries the mirror. The matt disk 2 is disposed underneath the stationary diffraction element 5 and can be moved in the scanning directions 22 corresponding to the Y direction.

The beam 7 of the laser 1 projected onto the diffraction element 5 is reflected in the form of the diffracted beams 8, 9, 10 and produces diffraction patterns 11, 12, 13 on the matt disk 2 which are characteristic of the diffraction element 5.

The diffraction pattern reflected from the diffraction element 5 comprises a multiplicity of bright spots (intensity maxima) and intensity minima in between. These optical points are imaged onto the matt disk 2 and observed by a CCD camera (not shown in FIG. 1). An appropriate computer program identifies the bright spots and analyzes them to determine:

1. the intensity of each spot, or the intensity ratio between spots (in most cases only two bright spots are visible; higher orders of intensity maxima are too weak to observe);

2. the distance between two of the bright spots; and 3. where the bright spots are located if the entire area of the matt disk is scanned (e.g., the angle between two bright spots can be measured).

It is also possible for the camera and the associated computer software to examine predetermined areas of the matt disk and to determine whether no bright spots are present in the predetermined area.

The results of the computer analysis may then be compared with the predetermined parameters (e.g. intensities, intensity ratios, distances, locations, angles, and/or areas without bright spots) to determine whether or not the document is authentic.

In the preferred embodiment of the invention, all of the foregoing characteristics are analyzed but it is also possible to use less then all characteristics (for example, two or three) to determine authenticity. Other characteristics can also be used in accordance with the invention.

Figure 2:
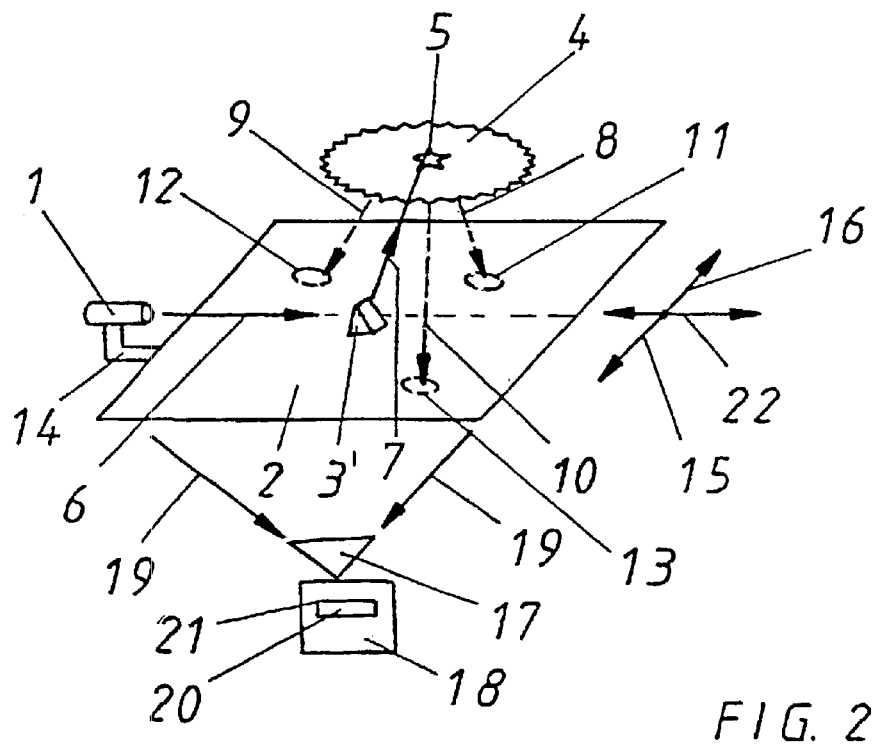
FIG. 2 shows a diagrammatic second embodiment.

FIG. 2 shows a matrix camera 18 having a lens 17 which lies in the beam path 19 of the matt disk 2 and detects all diffraction patterns 11–13 on the matt disk 2. The patterns are evaluated with a CCD chip 20 disposed underneath the matt disk 2.

In FIG. 2, the laser 1 is connected to the matt disk 2 by a holder 14. The matt disk 2 is constructed so that it can be moved in the directions of arrows 15 and 16 as well as in the directions of arrows 22.

This embodiment has the advantage that a relatively small mirror 3' can be provided. The length of mirror 3' is significantly less than the width of the matt disk 2. In this case, however, the matt disk 2 must be movable in the X and Y directions.

In this embodiment (and that of FIG. 1) the camera 18 is disposed below the matt disk 2 and the diffraction pattern is projected onto the image area 21 of the CCD chip 20.

Figure 3:
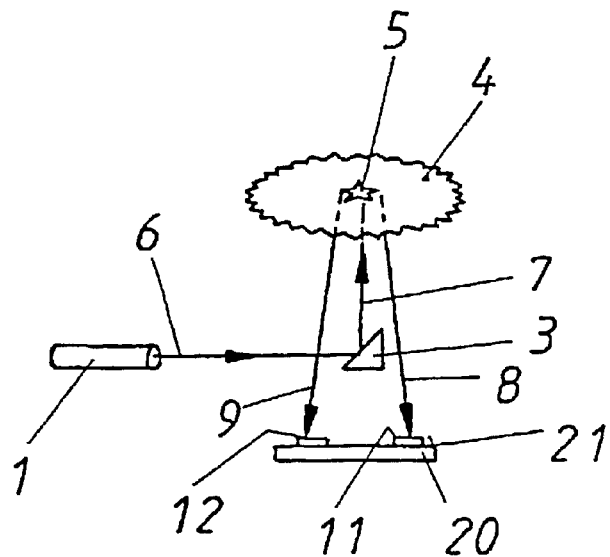
FIG. 3 shows a device in which a screen is not used.

In FIG. 3, the diffraction pattern is projected directly onto the image area 21 of the CCD chip.

Figure 4:
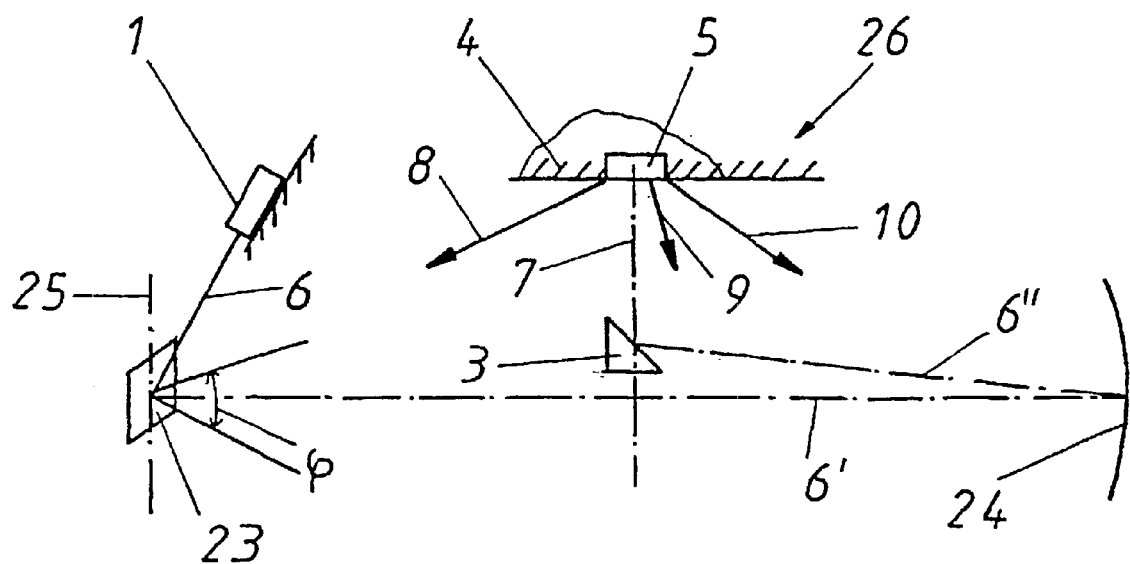
FIG. 4 shows another embodiment of the invention.

FIG. 4 diagrammatically shows an arrangement in which the laser 1 is fixed to the housing. The beam 6 generated by the laser 1 falls onto a rotating mirror 23, which can be deflected by a certain angle $\phi$ about an axis of rotation 25. The laser beam 6', deflected by the rotating mirror 23, is then deflected by a telecentric mirror 24 fixed to the housing as laser beam 6" and then passed onto a deflecting mirror 3, from which it is directed as a laser beam 7 onto the document 26 or its distinguishing authenticity region 4 with the diffraction element 5.

REFERENCE SYMBOLS 1. laser
2. matt disk
3, 3'. mirror
4. distinguishing authenticity region
5. diffraction element
6. beam
7. beam
8. diffracted beam
9. diffracted beam
10. diffracted beam
11. diffraction pattern
12. diffraction pattern
13. diffraction pattern
14. holder
15. arrow direction
16. arrow direction
17. lens
18. camera
19. beam path
20. CCD chip
21. image area
22. scanning direction
23. rotating mirror
24. telecentric mirror
25. axis of rotation
26. document

We claim:

1. Apparatus for evaluating a distinguishing authenticity feature comprising at least one diffraction element, a source of optical energy for illuminating the diffraction element to produce a diffraction pattern representative of said authenticity feature, and an evaluating unit, comprising
- a screen on which the diffraction pattern is imaged,
- means for moving the screen,
- means for redirecting the optical energy from said light source onto the diffraction element, said redirecting means being movable with the screen, and
- a camera for recording the diffraction pattern imaged on the screen.

2. Apparatus according to claim 1, wherein the camera is a matrix or line camera.

3. Apparatus according to claim 1, wherein the redirecting means extends over substantially the whole width of the screen.

4. Apparatus according to claim 1, wherein the redirecting means is a mirror.

5. Apparatus according to claim 1, wherein the evaluating unit evaluates the image recorded by the camera.

6. Apparatus according to claim 5, wherein the evaluating unit evaluates only a portion of the screen.

7. Apparatus according to claim 1, wherein the illumination source is fastened to the screen.

8. Apparatus according to claim 1, wherein the illumination source is movable.

9. Apparatus according to claim 1, wherein the illumination source is stationary and a deflectable rotating mirror is provided, onto which the beam of the illumination is directed.

10. Apparatus according to claim 1, wherein the illumination source is a laser.

11. Apparatus according to claim 1, wherein the redirecting means is mounted on the screen.

* * * * *

UNITED STATES PATENT AND TRADEMARK OFFICE
CERTIFICATE OF CORRECTION

PATENT NO.    : 6,750,465 B2
DATED         : June 15, 2004
INVENTOR(S)   : Arnim Franz-Burgholz et al.

It is certified that error appears in the above-identified patent and that said Letters Patent is hereby corrected as shown below:

Title page,
Item [22], Filing Date:, please delete "November 25, 2002" and substitute
-- November 22, 2002 --.

Signed and Sealed this

Twenty-third Day of November, 2004

JON W. DUDAS
*Director of the United States Patent and Trademark Office*